US012272286B2

(12) United States Patent
Jia et al.

(10) Patent No.: US 12,272,286 B2
(45) Date of Patent: Apr. 8, 2025

(54) METHOD AND APPARATUS FOR DRIVING DISPLAY PANEL, AND DISPLAY DRIVER INTEGRATED CIRCUIT CHIP

(71) Applicant: XIAMEN TIANMA DISPLAY TECHNOLOGY CO., LTD., Xiamen (CN)

(72) Inventors: Runtao Jia, Xiamen (CN); Ying Sun, Xiamen (CN); Qiang Chen, Xiamen (CN); Weixing Liu, Xiamen (CN); Yu Zheng, Xiamen (CN); Xianyun Hou, Xiamen (CN)

(73) Assignee: XIAMEN TIANMA DISPLAY TECHNOLOGY CO., LTD., Xiamen (CN)

( * ) Notice: Subject to any disclaimer, the term of this patent is extended or adjusted under 35 U.S.C. 154(b) by 0 days.

(21) Appl. No.: 18/748,135

(22) Filed: Jun. 20, 2024

(65) Prior Publication Data

US 2024/0339062 A1 Oct. 10, 2024

(30) Foreign Application Priority Data

Dec. 28, 2023 (CN) ......................... 202311841435.4

(51) Int. Cl.
*G09G 3/20* (2006.01)

(52) U.S. Cl.
CPC ........... *G09G 3/20* (2013.01); *G09G 2310/04* (2013.01); *G09G 2320/02* (2013.01); *G09G 2320/0613* (2013.01); *G09G 2320/103* (2013.01); *G09G 2330/021* (2013.01); *G09G 2340/0435* (2013.01); *G09G 2354/00* (2013.01)

(58) Field of Classification Search
CPC .. G09G 3/20; G09G 2310/04; G09G 2320/02; G09G 2320/0613; G09G 2320/103; G09G 2330/021; G09G 2340/0435; G09G 2354/00
See application file for complete search history.

(56) References Cited

U.S. PATENT DOCUMENTS

| | | | | |
|---|---|---|---|---|
| 2020/0319463 | A1* | 10/2020 | Nakamura | H04N 21/4318 |
| 2020/0319508 | A1* | 10/2020 | Hsieh | G09G 3/3413 |
| 2020/0319836 | A1* | 10/2020 | Ohe | G06F 3/04845 |
| 2020/0319839 | A1* | 10/2020 | Mikami | G09G 5/38 |
| 2020/0320956 | A1* | 10/2020 | Liu | G09G 3/2092 |

* cited by examiner

*Primary Examiner* — Sejoon Ahn
(74) *Attorney, Agent, or Firm* — KILPATRICK TOWNSEND & STOCKTON LLP

(57) ABSTRACT

A method and an apparatus for driving a display panel, and a display driver integrated circuit chip are provided. The method includes: determining an order in which display divisions on the display panel are to be driven, when determined not to update respective refresh rates of the display divisions; determining electric signal gear ranges for the display divisions based on the refresh rates of the display divisions, respectively; and driving the display divisions sequentially in the determined order and based on the determined gear ranges. With this method, the power consumption can be reduced while the display effect is improved.

16 Claims, 9 Drawing Sheets

METHOD AND APPARATUS FOR DRIVING DISPLAY PANEL, AND DISPLAY DRIVER INTEGRATED CIRCUIT CHIP

The present application claims priority to Chinese Patent Application No. 202311841435.4, titled "METHOD AND APPARATUS FOR DRIVING DISPLAY PANEL, AND DISPLAY DRIVER INTEGRATED CIRCUIT CHIP", filed on Dec. 28, 2023 with the China National Intellectual Property Administration, which is incorporated herein by reference in its entirety.

FIELD

The present disclosure relates to the field of displays, and in particular to a method for driving a display panel, an apparatus for driving a display panel, and a display driver integrated circuit chip.

BACKGROUND

As display technology develops by leaps and bounds, various display devices, such as mobile phones, tablets, and virtual reality (VR) devices, are widely used in daily life. In addition, many display devices are capable of split screen.

In the conventional technology, a display panel in a display device is generally driven by a constant electric signal gear, resulting in poor visual effects when facing a demand for high image quality, and resulting in unnecessary power consumption when facing a demand for low image quality.

SUMMARY

Based on this, in view of the above problem, a method for driving a display panel, an apparatus for driving a display panel, a computer device, a computer-readable storage medium and a computer program product are provided, to reduce the power consumption and ensure the display effect.

In one embodiment, a method for driving a display panel is provided according to the present disclosure. The method includes: determining an order in which display divisions on the display panel are to be driven, when determined not to update respective refresh rates of the display divisions; determining electric signal gear ranges for the display divisions based on the refresh rates of the display divisions, respectively; and driving the display divisions sequentially in the determined order and based on the determined gear ranges.

In an embodiment, the determining electric signal gear ranges for the display divisions based on the refresh rates of the display divisions includes: determining the electric signal gear range for the display division of a first preset refresh rate as a first gear range; determining the electric signal gear range for the display division of a second preset refresh rate as a second gear range; determining the electric signal gear range for the display division of a third preset refresh rate as a third gear range; determining the electric signal gear range for the display division of a fourth preset refresh rate as a fourth gear range; and determining the electric signal gear range for the display division of a fifth preset refresh rate as a fifth gear range. The first preset refresh rate, the second preset refresh rate, the third preset refresh rate, the fourth preset refresh rate and the fifth preset refresh rate are in ascending order, and an extreme value in the first gear range, an extreme value in the second gear range, an extreme value in the third gear range, an extreme value in the fourth gear range, and an extreme value in the fifth gear range are in ascending order.

In an embodiment, the method further includes: acquiring a resolution of the current display division; and increasing a minimum gear and a maximum gear within the electric signal gear range corresponding to the current display division, if the resolution of the current display division is greater than a first preset resolution. The first preset resolution is set based on a test result of a display effect of the display panel.

In an embodiment, the driving the display divisions sequentially in the determined order and based on the determined gear ranges includes: determining at least one electric signal gear for each of the display divisions from the corresponding electric signal gear range; and driving the display divisions sequentially in the determined order and the respective electric signal gears of the display divisions.

In an embodiment, the determining at least one electric signal gear for each of the display divisions from the corresponding electric signal gear range includes: determining an electric signal gear for switching from one light-emitting unit to an adjacent light-emitting unit in the same display division, from the electric signal gear range corresponding to the display division and based on a voltage difference between electric signals applied to the two light-emitting units. The light-emitting unit comprises pixels arranged in a single row or pixels arranged in multiple rows.

In an embodiment, the method further includes: sending a control command to a display driver integrated circuit (DDIC) to reduce an output voltage of the display panel, if the voltage difference is greater than a preset voltage difference; and decreasing a minimum gear and a maximum gear within the electric signal gear range corresponding to the display division as the output voltage of the display panel is reduced by the DDIC.

In an embodiment, the determining an electric signal gear for switching from one light-emitting unit to an adjacent light-emitting unit in the same the display division, from the electric signal gear range corresponding to the display division and based on a voltage difference between electric signals applied to the two light-emitting units includes: determining a maximum gear within the electric signal gear range corresponding to the display division as the electric signal gear if the voltage difference is greater than or equal to a first preset value; determining a median gear within the electric signal gear range corresponding to the display division as the electric signal gear if the voltage difference is greater than a second preset value and less than the first preset value, wherein the first preset value and the second preset value are set based on a test result of a display effect of the display panel; and determining a minimum gear within the electric signal gear range corresponding to the display division as the electric signal gear if the voltage difference is less than or equal to the second preset value.

In an embodiment, the driving the display divisions sequentially in the determined order and the respective electric signal gears of the display divisions includes: driving, for each of the display divisions, the light-emitting units in the display division sequentially in an order in which the light-emitting units are to emit light, based on the electric signal gears corresponding to the light-emitting units.

In an embodiment, the method further includes: updating the respective refresh rates of the display divisions in real time.

In an embodiment, the updating the respective refresh rates of the display divisions in real time includes: increasing the refresh rate in response to an operation on the responding display division, wherein the operation in the display division comprises one of a touch operation, a pupil operation, a gesture operation, and an intelligent voice operation.

In an embodiment, the updating the respective refresh rates of the display divisions in real time includes: updating the refresh rate of the display division based on an application type and an image state of a real-time image in the display division.

In an embodiment, the image state includes a dynamic state and a static state, and the application type at least includes a text application and a media application.

In an embodiment, the method further includes: controlling a display driver integrated circuit (DDIC) to update a pulse-width parameter of a pixel writing signal if the real-time image in the display division is in the static state; and decreasing a maximum gear and a minimum gear within the electric signal gear range corresponding to the display division after the pulse-width parameter of the pixel writing signal is updated.

In an embodiment, the method further includes: acquiring a resolution of the display division, if the real-time image in the display division corresponds to the media application; controlling a display driver integrated circuit (DDIC) to update a pulse-width parameter of a pixel writing signal, in a case that the resolution of the display division is less than a second preset resolution, where the second preset resolution is set based on a test result of a display effect of the display panel; and decreasing a maximum gear and a minimum gear within the electric signal gear range corresponding to the display division after the pulse-width parameter of the pixel writing signal is updated.

In an embodiment, the display divisions are formed by dividing one display panel, or cascading multiple display panels.

In one embodiment, an apparatus for driving a display panel is further provided according to the present disclosure. The apparatus includes a driving order determining module, a gear range determining module and a display driving module.

The driving order determining module is configured to determine an order in which display divisions on the display panel are to be driven when determined not to update respective refresh rates of the display divisions.

The gear range determining module is configured to determine electric signal gear ranges for the display divisions based on the refresh rates of the display divisions, respectively.

The display driving module is configured to drive the display divisions sequentially in the determined order and based on the determined gear ranges.

In one embodiment, a display driver integrated circuit (DDIC) chip is further provided according to the present disclosure. The DDIC chip includes a memory and a processor. The memory stores a computer program. The processor is configured to execute the computer program to: determine an order in which display divisions on the display panel are to be driven, when determined not to update respective refresh rates of the display divisions; determine electric signal gear ranges for the display divisions based on the refresh rates of the display divisions, respectively; and drive the display divisions sequentially in the determined order and based on the determined gear ranges.

With the method for driving a display panel, the apparatus for driving a display panel, and the display driver integrated circuit chip described above, the order in which display divisions are to be driven is determined when determined not to update respective refresh rates of the display divisions. Electric signal gear ranges for the display divisions are determined based on the refresh rates of the display divisions, respectively. The display divisions are driven sequentially in the determined order and based on the determined gear ranges. With the method, for each of the display divisions, the electric signal gear range corresponding to the display division is determined based on the refresh rate of the display division. Therefore, each of the display divisions can be accurately driven, which is beneficial to improving the overall display effect of the display panel. In addition, the electric signal gear range corresponding to each of the display divisions is precisely updated, avoiding the unnecessary power consumption, to reduce the power consumption while improving the display effect.

DETAILED DESCRIPTION

Figure 1:
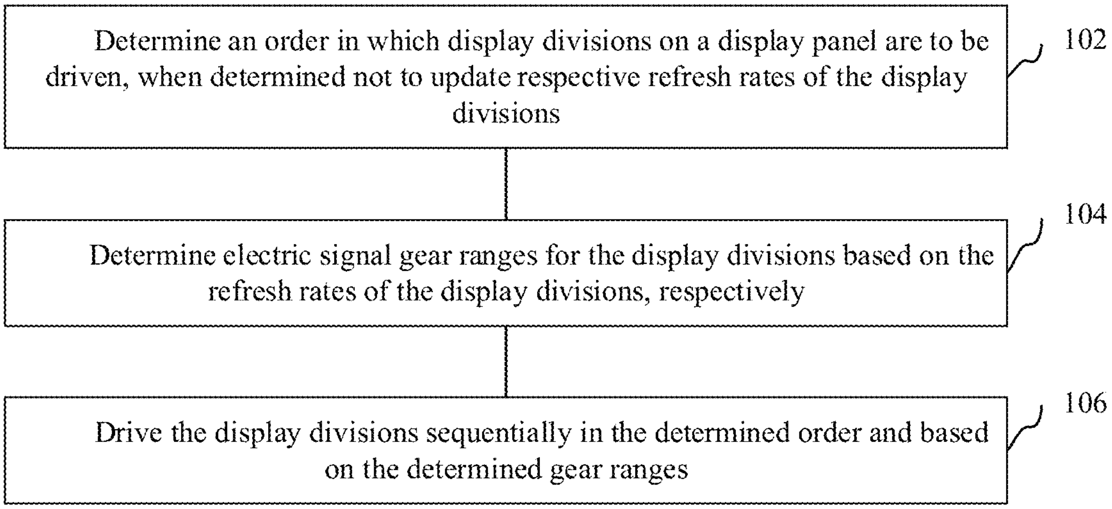
FIG. 1 is a flow chart illustrating a method for driving a display panel according to an embodiment of the present disclosure.

In order to facilitate the understanding of the present disclosure, the present disclosure is described more comprehensively with reference to the drawings below. The embodiments of the present disclosure are shown in the drawings. However, the present disclosure may be implemented in various forms and is not limited to the embodiments described herein. These embodiments are provided for thoroughly and comprehensively understanding the present disclosure.

Unless otherwise defined, all technical and scientific terms used herein have the same meaning as commonly understood in the art. The terms used herein in the description of the present disclosure is only for describing specific embodiments, which are not intended to limit the present disclosure. The term "and/or" as used herein includes any and all combinations of one or more of the relevant listed items.

For describing positional relationships, unless otherwise specified, when an element such as a layer, film, or substrate is referred to as "on" another element, the element is directly on the other element or an intermediate element may exist between the element and the other element. Furthermore, when a layer is referred to as "below" another layer, the layer is directly below another layer, or one or more intermediate elements may exist between the layer and the other layer. It can also be understood that when a layer is referred to as "between" two layers, the layer is the only layer between the two layers, or one or more intermediate elements are between the two layers.

In a case that the terms "comprising", "having", and "including" are used herein, another element may further be added unless otherwise clearly defined with terms like "only", and "composed of . . . ". Unless otherwise clearly specified, the singular form may include the plural form and cannot be understood as one in number.

It should be understood that although terms "first", "second", and the like may be used for describing various elements herein, these elements should not be limited by these terms. These terms are used only for distinguishing one element from another. For example, the first element may be referred to as the second element, and similarly, the second element may be referred to as the first element, without departing from the scope of the present disclosure.

It should also be understood that when an element is described, although not explicitly described herein, the element is interpreted to include an error range. The error range is within a specific acceptable deviation range determined as in the art. For example, "about", "approximately", or "basically" may indicate one or more standard deviations, which is not limited herein.

In addition, in the specification, the phrase "planar distribution diagram" refers to a diagram of a target part observed from above, and the phrase "cross-sectional view" refers to a diagram, observed through from the side, of a cross section obtained by vertically cutting a target part.

In addition, the drawings are not drawn in a 1:1 scale, and a relative dimension of each of elements is exemplarily illustrated in the drawings, not necessarily drawn in accordance with an actual scale.

As described in the background, in the conventional technology, a display panel in a display device is generally driven by a constant electric signal gear, resulting in poor visual effects when facing a demand for high image quality, and resulting in unnecessary power consumption when facing a demand for low image quality.

In order to solve this problem, a method for driving a display panel is provided according to the present disclosure. As shown in FIG. 1, the method is applied to a display device including the display panel. The method includes the following steps 102, 104 and 106.

In step 102, an order in which display divisions in the display panel are to be driven is determined, when determined not to update respective refresh rates of the display divisions.

The display panel of the display device is divided into multiple display divisions. The multiple display divisions display different content. The display panel is divided into various display divisions according to user requirements, for the user to view and operate multiple contents simultaneously. In one embodiment, the display panel is divided in a fixed manner, a dynamic manner, a customized manner, and an automatic manner.

Figure 2:
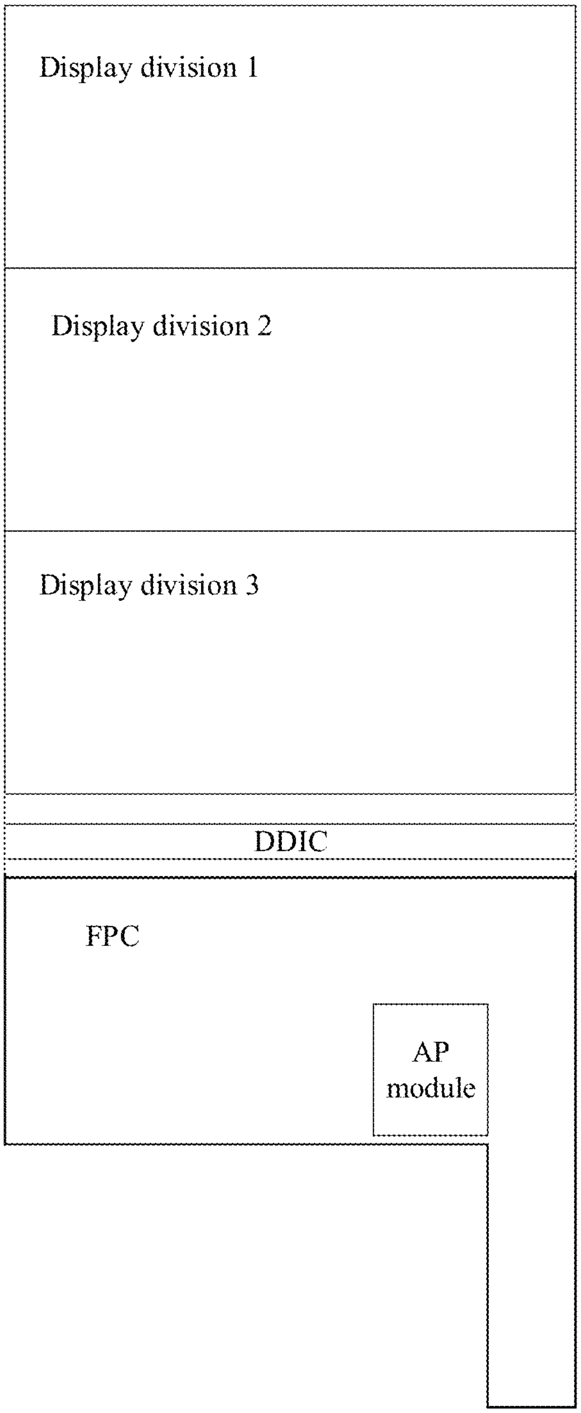
FIG. 2 is a schematic structural diagram illustrating a display device according to an embodiment of the present disclosure.

The method according to the embodiment may be applied to the display device shown in FIG. 2. Reference is made to FIG. 2, which is a schematic structural diagram illustrating a display device. The display device includes a display panel and a flexible printed circuit (FPC). The display panel includes multiple display divisions. As shown in FIG. 2, the number of the display divisions is 3, that is, a display division 1, a display division 2, and a display division 3. The FPC is provided with an application processor (AP) module and a display driver integrated circuit (DDIC) chip.

In one embodiment, whether to update the refresh rate of the display division is determined as follows. The AP module receives a tearing effect (TE) signal generated by the DDIC chip, and monitors a refresh rate of each of the display divisions in real time based on a change in the TE signal, to determine whether the refresh rate of each of the display divisions is to be updated. In one embodiment, when the TE signal greatly changes or screen tearing, screen fault, or the like occurs on an image of the display division, it is determined to update the refresh rate. The TE signal is configured to detect whether the screen tearing occurs when a screen is refreshed during image display. In a case that it is detected that the TE signal changes slowly, the order in which the display divisions are to be driven is determined based on an order of changes in refresh rates obtained from the TE signal.

In one embodiment, the order for driving the display divisions is determined based on the refresh rate of each of the display divisions obtained from the TE signal. For example, the display panel includes multiple divisions, and each of the divisions corresponds to a refresh rate. First, a division with the highest refresh rate is driven. Next, a division with a second highest refresh rate is driven. Finally, a division with the lowest refresh rate is driven.

The TE signal is a periodic pulse signal. The TE signal is configured to control pixels on the display panel to be on or off. During a process of driving the display panel, changes in frequency and phase of the TE signal are closely related to the change in the refresh rate. In one embodiment, when the refresh rate of the display panel changes, the frequency and the phase of the TE signal also change accordingly.

For example, the order in which the display divisions are to be driven is determined by the change in the frequency of the TE signal. The TE signal is configured to monitor a change in a refresh rate of a currently driven display division of the display device. That is, an order in which the refresh rates of a display screen are updated is determined by acquiring the TE signal, to determine the order in which the display divisions in the display device are to be driven.

In step 104, for each of the display divisions, an electric signal gear range corresponding to the display division is determined based on the refresh rate of the display division.

The electric signal gear is a source operational amplifier (OP) gear. A source signal is an electric signal that is outputted to the display panel, and is configured to display an image on the display panel. The source OP gear represents the ability of an electric signal to rapidly reach a target voltage. An operational amplifier is configured to amplify and process a signal to drive the display screen of the display device to operate.

For example, for each of the display divisions, the electric signal gear range corresponding to the display division is determined based on the refresh rate of the display division. In one embodiment, a correspondence between the refresh rate and the electric signal gear range is preset. During testing the display device, an image acquiring device acquires display effect of displayed images under various refresh rates and electric signal gears, to determine the correspondence between the refresh rate and the electric signal gear range.

In step 106, the display divisions are sequentially driven based on the determined order and the electric signal gear ranges corresponding to the display divisions.

For example, the display divisions are sequentially driven in the determined order. During the driving process, signal strength outputted to each of the display division is precisely updated based on the electric signal gear range corresponding to the display division, and the image can be displayed accurately and stably.

In the method for driving a display panel described above, the order in which display divisions are to be driven is determined when determined not to update respective refresh rates of the display divisions. Electric signal gear ranges for the display divisions are determined based on the refresh rates of the display divisions, respectively. The display divisions are driven sequentially in the determined order and based on the determined gear ranges. With the method, for each of the display divisions, the electric signal gear range corresponding to the display division is determined based on the refresh rate of the display division. Therefore, each of the display divisions can be accurately driven, which is beneficial to improving the overall display effect of the display panel. In addition, the electric signal gear range corresponding to each of the display divisions is precisely updated, avoiding the unnecessary power consumption, to reduce the power consumption while improving the display effect.

In an embodiment, the display divisions are formed by dividing one display panel or cascading multiple display panels.

In practice, the display divisions formed by dividing one display panel are controlled independently, and the display divisions display different contents, which is suitable for a multi-task, multi-interface application scenario and the like. In addition, the display divisions are from the same display panel, and the display divisions can be seamlessly spliced, providing a larger display area and a wide variety of visual effect.

The display divisions formed by cascading multiple display panels may expand the display area, which is suitable for an application scenario for a large display space. In addition, the display panels are controlled independently, and multiple contents can be displayed in parallel, to improve operation efficiency.

Figure 3:
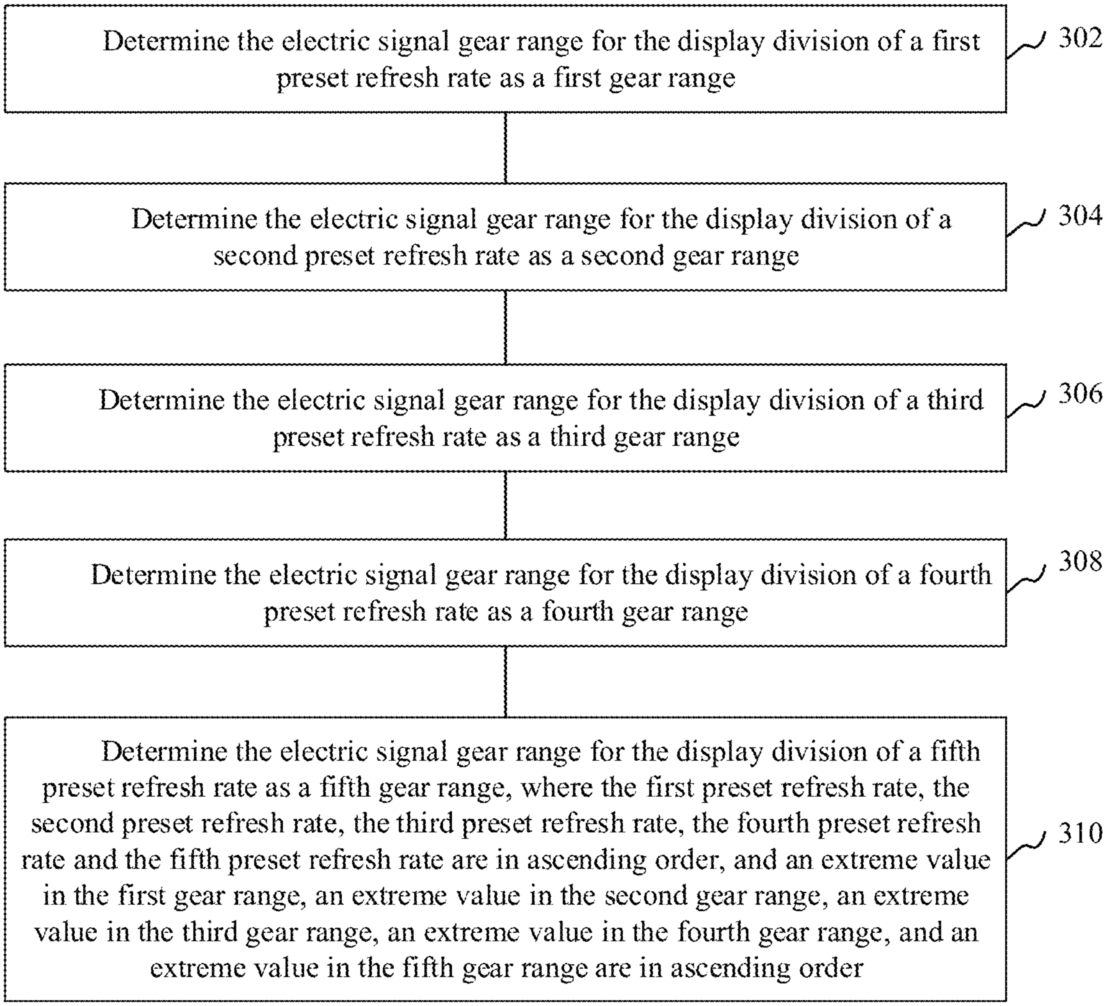
FIG. 3 is a flow chart illustrating determination of an electric signal gear range according to an embodiment of the present disclosure.

In an embodiment, reference is made to FIG. 3, which is a flow chart illustrating determination of the electric signal gear range according to an embodiment. The step 104 includes the following steps 302, 304, 306, 308 and 310.

In step 302, in a case that the refresh rate of the current display division is a first preset refresh rate, the electric signal gear range corresponding to the display division is determined as a first gear range.

In step 304, in a case that the refresh rate of the current display division is a second preset refresh rate, the electric signal gear range corresponding to the display division is determined as a second gear range.

In step 306, in a case that the refresh rate of the current display division is a third preset refresh rate, the electric signal gear range corresponding to the display division is determined as a third gear range.

In step 308, in a case that the refresh rate of the current display division is a fourth preset refresh rate, the electric signal gear range corresponding to the display division is determined as a fourth gear range.

In step 310, in a case that the refresh rate of the current display division is a fifth preset refresh rate, the electric signal gear range corresponding to the display division is determined as a fifth gear range. The first preset refresh rate, the second preset refresh rate, the third preset refresh rate, the fourth preset refresh rate and the fifth preset refresh rate are in ascending order. Extreme values in the first gear range, the second gear range, the third gear range, the fourth gear range, and the fifth gear range are in ascending order.

Multiple preset refresh rates are set for the display device, and include the first preset refresh rate, the second preset refresh rate, the third preset refresh rate, the fourth preset refresh rate, and the fifth preset refresh rate that are s in ascending order. In practice, the first preset refresh rate is 1 Hz, the second preset refresh rate is 30 Hz, the third preset refresh rate is 60 Hz, the fourth preset refresh rate is 90 Hz, and the fifth preset refresh rate is 120 Hz. In other embodiments, other preset refresh rates are set according to the display requirements of the display device.

Multiple electric signal gears are set for the display device, and multiple gear ranges for controlling an electric signal are determined based on the multiple electric signal gears, that is, minimum gears of the first gear range, the second gear range, the third gear range, the fourth gear range, and the fifth gear range that are in ascending order, and maximum gears of the first gear range, the second gear range, the third gear range, the fourth gear range, and the fifth gear range that are in ascending order. In practice, the electric signal gears are first to fifteenth gears, and the gears in ascending order are sequentially grouped as the gear ranges for controlling an electric signal. In one embodiment, the electric signal gears within various gear ranges may be partially overlapped. For example, the electric signal gear range corresponding to the first preset refresh rate includes the first to fifth gears, the electric signal gear range corresponding to the second preset refresh rate includes the fourth to eighth gears, and the electric signal gear range corresponding to the third preset refresh rate includes the seventh to eleventh gears.

In practice, the number of the gear ranges is not limited to 5. The above embodiment is an optimal solution determined through experiments. In an actual application, the gear range may be flexibly updated according to specific requirements and the application scenario, to meet various requirements. For example, the updating can be made based on requirements for the refresh rate of the display division, the actual application scenario, requirements for the accuracy and flexibility of the gear, requirements and preferences of users, the performance of the display device and the like.

For example, the AP module determines the electric signal gear range corresponding to the refresh rate of the current display division based on the preset correspondence between the refresh rate and the electric signal gear range. In one embodiment, the correspondence between each of the preset refresh rates and the electric signal gear range is pre-stored.

In the above embodiment, the electric signal gear range is determined based on the preset refresh rate, and an output signal of the display panel can be adaptively updated, to meet various requirements for the refresh rate. The electric signal gear range is properly determined based on the preset refresh rate, to reduce the power consumption while improving the display effect.

In an embodiment, the method further includes acquiring a resolution of the current display division; and increasing a minimum gear and a maximum gear within the electric signal gear range corresponding to the current display division, in a case that the resolution of the current display division is greater than a first preset resolution. The first preset resolution is set based on a test result of the display effect of the display panel.

For example, the resolution of each of the display divisions on the display panel is acquired, and it is determined whether to update the minimum gear and the maximum gear within the electric signal gear range corresponding to the current display division based on the resolution of the current display division. In one embodiment, the first preset resolution is determined. In a case that the display panel has a display division with a resolution greater than the first preset resolution, the minimum gear and the maximum gear within the electric signal gear range corresponding to the display division with the resolution greater than the first preset resolution are increased. In one embodiment, an updating range of the minimum gear and an updating range of the maximum gear in electric signal gear range are determined based on a difference between the resolution of the display division and the first preset resolution.

The first preset resolution is determined based on the test result of the display effect of the display panel. In one embodiment, impact of various resolutions on the display effect of the display panel is evaluated by testing the display effect of the display panel, to determine one of the resolutions as the first preset resolution.

The first preset resolution is configured to determine whether the display division requires a high-definition and high-quality display effect. In a case that the resolution of the current display division is greater than the first preset resolution, it is determined that the current display division requires a better display effect.

In practice, the first preset resolution is generally set to 1920×1080 based on the test result. In a case that the resolution of the display panel is greater than 1920×1080, it indicates that the current display division requires a better display effect, and the electric signal gear range is to be updated, to improve the display effect of the display division.

In an embodiment, in a case that the resolution of the current display division is greater than the first preset resolution, if the current electric signal gear range includes the fourth to eighth gears, the electric signal gear range is updated to include the fifth to ninth gears.

In the above embodiment, in a case that the resolution of the current display division is greater than the first preset resolution, the minimum gear and the maximum gear within the electric signal gear range corresponding to the current display division are increased, which is beneficial to improving the display effect of the display panel. In addition, the electric signal gear range corresponding to each of the display divisions is precisely updated, avoiding the unnecessary power consumption, to reduce the power consumption while improving the display effect.

Figure 4:
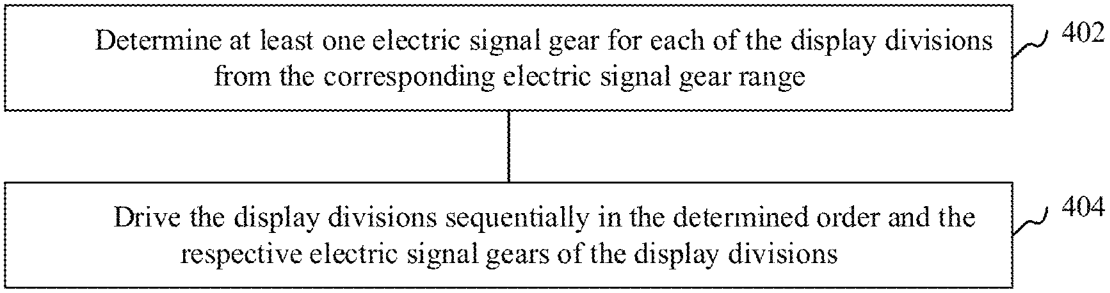
FIG. 4 is a flow chart illustrating the method for driving a display panel according to an embodiment of the present disclosure.

In an embodiment, reference is made to FIG. 4, which is a flow chart illustrating display driving according to an embodiment. The step 106 includes the following steps 402 and 404.

In step 402, for each of the display divisions, one or more electric signal gears corresponding to the display division are determined from the electric signal gear range corresponding to the display division.

In step 404, the display divisions are sequentially driven in the determined order and the determined electric signal gears corresponding to the display divisions.

Each of the display divisions corresponds to at least one electric signal gear.

In practice, the display panel has a display division for displaying a static image of low signal strength, and a display division for displaying a dynamic video of high signal strength. After the electric signal gear range corresponding to the display division is determined, one or more electric signal gears corresponding to the display division are determined from the electric signal gear range based on content displayed in the display division.

For example, at least one electric signal gear is determined from the electric signal gear range corresponding to each of the display divisions, and various display divisions are sequentially driven in the determined order and the electric signal gear range corresponding to each of the display divisions.

In the above embodiment, one or more electric signal gears corresponding to each of the display divisions are determined, and various display divisions are sequentially driven in the determined order and one or more electric signal gears corresponding to each of the display divisions, achieving display optimization for various display divisions and improving the display effect.

In an embodiment, the step 402 includes the following step 4022.

In step 4022, for each of the display divisions, an electric signal gear is determined from the electric signal gear range corresponding to the display division based on a voltage difference between electric signals supplied to adjacent light-emitting units in the display division. The electric signal gear is configured to switch a light-emitting unit to the other light-emitting unit. The light-emitting unit includes pixels arranged in a single row or pixels arranged in multiple rows.

The display division includes multiple light-emitting units. Each of the light-emitting units includes pixels arranged in a single row or pixels arranged in multiple rows. The voltage difference between the electric signals supplied to the adjacent light-emitting units is a voltage difference between adjacent light-emitting units. The light-emitting unit is configured to display various contents under the control of the electric signal.

One display division corresponds to multiple groups of adjacent light-emitting units. Each of the multiple groups of adjacent light-emitting units includes a light-emitting unit that first displays and a light-emitting unit that subsequently displays. In one embodiment, in a case that one display division includes 10 light-emitting units, the display division corresponds to 9 groups of adjacent light-emitting units.

For example, the DDIC chip acquires voltages of electric signals supplied to light-emitting units for the display division to display an image, to determine the voltage difference between the electric signals supplied to adjacent light-emitting units in the display division. The electric signal gear is configured to switch a light-emitting unit to another light-emitting unit among the adjacent light-emitting units, and is determined from the electric signal gear range corresponding to the display division based on the voltage difference between the electric signals. In one embodiment, the above process is achieved by a preset correspondence between the voltage difference and the electric signal gear. During the testing the display device, the image acquiring device acquires display effect of displayed images under various voltage differences and electric signal gears, to determine the correspondence between the voltage difference and the electric signal gear.

In the above embodiment, for each of the display divisions, the electric signal gear corresponding to adjacent light-emitting units is determined more precisely based on the voltage difference between the electric signals supplied to the adjacent light-emitting units in the display division, to improve the display effect and avoiding unnecessary power consumption.

In an embodiment, the method further includes: sending a control command to a DDIC to reduce an output voltage of the display panel, if the voltage difference is greater than a preset voltage difference; and decreasing a minimum gear and a maximum gear within the electric signal gear range corresponding to the display division as the output voltage of the display panel is reduced by the DDIC.

The preset voltage difference is a difference threshold set based on experience. The control command is configured to instruct the DDIC to reduce the output voltage of the display panel. The output voltage of the display panel is a maximum voltage applied to the display panel.

In one embodiment, the output voltage of the display panel is determined based on a voltage of a gamma module. The voltage of the gamma module includes a maximum voltage and a minimum voltage of the gamma module. The maximum voltage and the minimum voltage of the gamma module each are a display brightness value corresponding to a gray-scale value. The gray-scale value ranges from 0 to 255. The maximum voltage of the gamma module is a voltage for a gray-scale value of 0. The minimum voltage of the gamma module is a voltage for a gray-scale value of 255.

For example, a voltage of each of light-emitting units on each of the display divisions of the display device is acquired in real time, to monitor the voltage difference between electric signals supplied to adjacent light-emitting units. In a case that the voltage difference between electric signals supplied to adjacent light-emitting units is greater than the preset voltage difference, the AP module sends the control command to the DDIC, the DDIC receives the control command from the AP module and reduces the output voltage of the display panel in response to the control command. In one embodiment, the output voltage is in a preset range of the output voltage. The DDIC determines an updating range of the output voltage based on the voltage difference between electric signals supplied to adjacent light-emitting units and the preset voltage difference.

After reducing the output voltage of the display panel in response to the control command, the DDIC feeds information that updating is completed back to the AP module. After determining that the DDIC reduces the output voltage of the display panel, the AP module determines to decrease the minimum gear and the maximum gear within the electric signal gear range corresponding to the current display division.

In the above embodiment, the output voltage and the electric signal gear range are automatically updated based on the voltage difference between electric signals supplied to adjacent light-emitting units, improving the display effect. In addition, the output voltage and the electric signal gear range are precisely controlled, to reduce the power consumption while improving the display effect.

Figure 5:
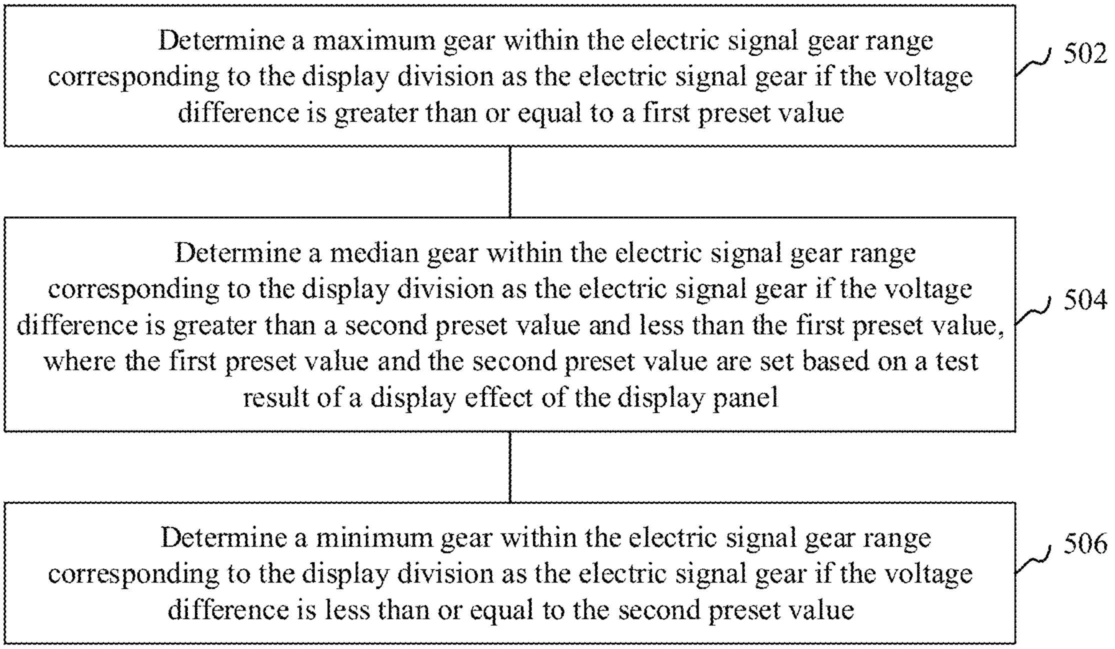
FIG. 5 is a flow chart illustrating determination of an electric signal gear according to an embodiment of the present disclosure.

Reference is made to FIG. 5, which is a flow chart illustrating determination of an electric signal gear according to an embodiment. The step 4022 includes the following steps 502, 504 and 506.

In step 502, based on the voltage difference between electric signals supplied to adjacent light-emitting units in the display division, a maximum gear within the electric signal gear range corresponding to the display division is determined as an electric signal gear corresponding to adjacent light-emitting units with a voltage difference greater than or equal to a first preset value. The electric signal gear is configured to switch a light-emitting unit to the other light-emitting unit among the adjacent light-emitting units.

In step 504, a median gear within the electric signal gear range corresponding to the display division is determined as an electric signal gear corresponding to adjacent light-emitting units with a voltage difference greater than a second preset value and less than the first preset value. The electric signal gear is configured to switch a light-emitting unit to the other light-emitting unit among the adjacent light-emitting units. The first preset value and the second preset value are determined based on the test result of the display effect of the display panel.

In step 506, a minimum gear within the electric signal gear range corresponding to the display division is determined as an electric signal gear corresponding to adjacent light-emitting units with a voltage difference less than or equal to the second preset value. The electric signal gear is configured to switch a light-emitting unit to the other light-emitting unit among the adjacent light-emitting units.

The second preset value is less than the first preset value. The first preset value and the second preset value are determined based on the test result of the display effect of the display panel.

In practice, during the testing the display effect of the display panel, the voltage difference between each two adjacent light-emitting units in the current display division is acquired, and the electric signal gear range corresponding to the display division is determined, the electric signal gear corresponding to the voltage difference is updated, to determine electric signal gears corresponding to various voltage differences while improving the display effect, to determine the first preset value and the second preset value.

In one embodiment, the first preset value and the second preset value are used to indicate the voltage difference between electric signals supplied to adjacent light-emitting units in the display division under different conditions. Various display divisions are different in the electric signal gear range, and further are different in the first preset value and the second preset value. The first preset value and the second preset value are determined according to the actual situation.

For example, the electric signal gear range corresponding to the display division includes the fifth to eighth gears. In a case that there are adjacent light-emitting units with a voltage difference greater than or equal to the first preset value, the eighth gear is determined as an electric signal gear corresponding to adjacent light-emitting units, and the electric signal gear is configured to switch a light-emitting unit to the other light-emitting unit among the adjacent light-emitting units. In a case that there are adjacent light-emitting units with a voltage difference less than or equal to the second preset value, the fifth gear is determined as an electric signal gear corresponding to the adjacent light-emitting units, and the electric signal gear is configured to switch a light-emitting unit to the other light-emitting unit among the adjacent light-emitting units. In a case that there are adjacent light-emitting units with a voltage difference greater than the second preset value and less than the first preset value, the sixth gear or the seventh gear is determined as an electric signal gear corresponding to the adjacent light-emitting units, and the electric signal gear is configured to switch a light-emitting unit to the other light-emitting unit among the adjacent light-emitting units. In one embodiment, a lower gear, i.e., the sixth gear, is generally selected by default, in order to reduce the power consumption.

For example, for each of the display divisions, a suitable gear is determined from the electric signal gear range corresponding to the display division based on the voltage difference between electric signals supplied to adjacent light-emitting units in the display division. In one embodiment, in a case that there are adjacent light-emitting units with a voltage difference greater than or equal to the first preset value, a maximum gear within the electric signal gear range corresponding to the display division is determined as the electric signal gear corresponding to the adjacent light-emitting units. In a case that there are adjacent light-emitting units with a voltage difference less than the first preset value and greater than the second preset value, a medium gear within the electric signal gear range corresponding to the display division is determined as the electric signal gear corresponding to the adjacent light-emitting units. In a case that there are adjacent light-emitting units with a voltage difference less than or equal to the second preset value, a minimum gear within the electric signal gear range corresponding to the display division is determined as the electric signal gear corresponding to the adjacent light-emitting units.

In the above embodiment, for each of the display divisions on the display panel, based on a voltage difference between electric signals supplied to adjacent light-emitting units in the display division, a gear corresponding to the voltage difference is determined from the electric signal gear range corresponding to the display division, in order to ensure the display effect and reduce the display power consumption.

In an embodiment, the step 404 includes: driving, for each of the display divisions, adjacent light-emitting units in an order for driving the light-emitting units, based on the electric signal gears corresponding to the light-emitting units.

For each of the display divisions, the order for driving the light-emitting units is an order in which light-emitting units arranged on the bottom of the display division are sequentially switched to light-emitting units arranged on the top of the display division. In one embodiment, reference is made to FIG. 6, which is a schematic diagram illustrating the order for driving the light-emitting units according to an embodiment.

Figure 6:
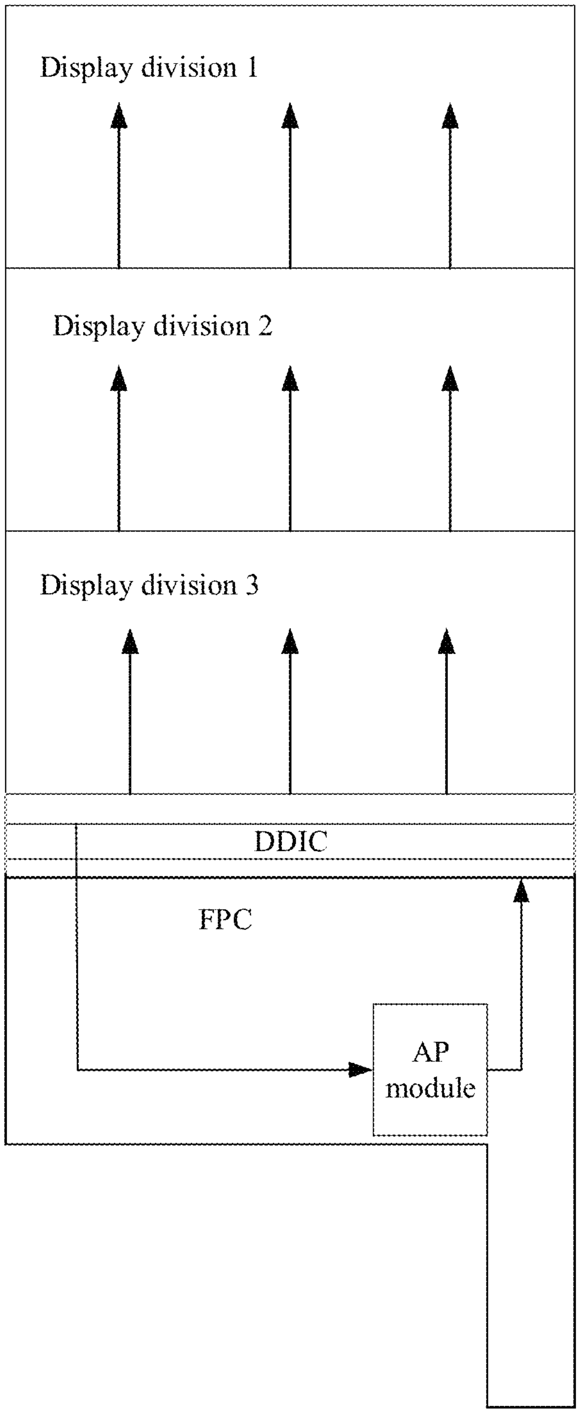
FIG. 6 is a schematic diagram illustrating the display panel according to an embodiment of the present disclosure.

As shown in FIG. 6, the display panel includes three display divisions, that is, a display division 1, a display division 2, and a display division 3. The order for driving the light-emitting units in the display division is an order in which light-emitting units arranged on the bottom of the display division are sequentially switched to light-emitting units arranged on the top of the display division for display.

In the display panel, all the display divisions are driven in the determined order. For example, as shown in FIG. 6, the display division 3, the display division 1 and the display division 2 are sequentially driven. For the display division 3, light-emitting units arranged on the bottom of the display division 3 are sequentially switched to light-emitting units arranged on the top of the display division 3. In one embodiment, in a case that the display division 3 includes 15 light-emitting units, the display division 3 corresponds to 14 groups of adjacent light-emitting units. The light-emitting units arranged on the bottom of the display division 3 are sequentially switched to light-emitting units arranged on the top of the display division 3.

In the above embodiment, for each of the display divisions, adjacent light-emitting units in the display division are sequentially driven based on the electric signal gear corresponding to the adjacent light-emitting units in the display division and the order for driving the light-emitting units in the display division, to achieve adaptive updating and improving the display effect.

In an embodiment, the method further includes: updating the refresh rate of the display division in real time.

In one embodiment, during using the display device, the refresh rate of the display division is updated based on content to be displayed in the display division. In one embodiment, the refresh rate used in the display division of the display device is generally preset. The preset refresh rate includes the first preset refresh rate, the second preset refresh rate, the third preset refresh rate, the fourth preset refresh rate, and the fifth preset refresh rate.

In practice, it is determined that the refresh rate is to be updated in response to an abnormal display effect. In one embodiment, the AP module determines whether to update the refresh rate of the display division based on a change in the TE signal. For example, in a case that screen tearing, screen fault, or the like occurs on an image of the display division, a waveform of the TE signal changes accordingly to remind the AP module to update the refresh rate of the display division, in order to reduce or eliminate the tearing effect, to improve the display effect.

For example, in a case that the refresh rate of the display division is the third preset refresh rate, it is determined to increase the refresh rate of the display division based on the change in the TE signal, and the refresh rate of the display division is updated from the third preset refresh rate to a higher refresh rate that is generally the fourth preset refresh rate.

In a case that it is determined that the refresh rate of each of the display divisions is not to be updated in real time, the electric signal gear range corresponding to each of the display divisions is determined based on the refresh rate of the display division.

In the above embodiment, the refresh rate of each of the display divisions is updated in real time, to reduce the power consumption while improving the display effect of the display division.

In an embodiment, the process of updating the refresh rate of the display division in real time includes: increasing the refresh rate in response to an operation in the display division. The operation in the display division includes one of a touch operation, a pupil operation, a gesture operation, and an intelligent voice operation.

The operation in the display division includes one of a touch operation, a pupil operation, a gesture operation, or an intelligent voice operation.

In practice, in response to an operation, the AP module determines whether the operation is performed in the display division. In a case that the AP module determines that the operation is performed in the display division, the AP module sends a relevant command to the DDIC to control the DDIC to increase the refresh rate of the display division.

In one embodiment, the touch operation in the display division is determined by determining whether there is a touch action in the display division by a sensor.

The pupil operation in the display division is determined by capturing a change in pupil of the user by a camera. In one embodiment, an operation intention of the user is determined based on a speed and a range of the change in pupil, to determine whether there is the pupil operation in the display division.

The gesture operation in the display division is determined by monitoring a hand action in real time by a built-in gesture sensor. In one embodiment, an operation intention of the user is determined based on a type and a position of the hand action, to determine whether there is the gesture operation in the display division.

The intelligent voice operation in the display division is determined by acquiring a voice signal form the user in real time by a microphone.

In the above embodiment, the refresh rate of the display division is updated in real time, that is, the refresh rate of the display division is increased in response to the operation in the display division by the user, which is beneficial to improving the interaction experience between the user and the display panel. In one embodiment, the refresh rate is increased in response to the touch operation, the pupil operation, the gesture operation or the intelligent voice operation by the user, speeding up the response of the display panel. In addition, the refresh rate of the display division is updated in real time based on operations of the user and display requirements, optimizing the display effect.

In an embodiment, the process of updating the refresh rate of the display division in real time includes updating the refresh rate of the display division based on an application type and an image state of a real-time image in the display division.

The image state includes a dynamic state and a static state, and the application type at least includes a text application and a media application.

In one embodiment, the image state is determined by comparing data in a current frame of the display image with data in a previous frame of the display image in the display division. In a case that there is a difference between the data in the current frame of the display image and the data in the previous frame of the display image in the display division, the image state is determined as the dynamic state. In a case that the data in the current frame of the display image is the same as the data in the previous frame of the display image in the display division, the image state is determined as the static state.

The application type of the real-time image is monitored in real time by a sensor or through an algorithm. For example, the application type of the display image is determined as video playing, gaming, web browsing, image display or the like.

In practice, in a case that the display image belongs to the video playing and content of the image is complex or varies frequently, the refresh rate is updated at a higher refresh rate, for smoothness and definition of the image. In a case that the display image belongs to a game, and rapid response and real-time interaction are necessitated by the game content, the refresh rate is updated at a higher refresh rate, in order to provide a better gaming experience. In a case that the display image belongs to the web browsing or image display, and content is relatively static or has less interaction, the refresh rate is updated at a lower refresh rate, in order to reduce power consumption and save resources.

In the above embodiment, the refresh rate of the display division is updated based on the application type and the image state of the real-time image in the display division, avoiding unnecessary power consumption.

Figure 7:
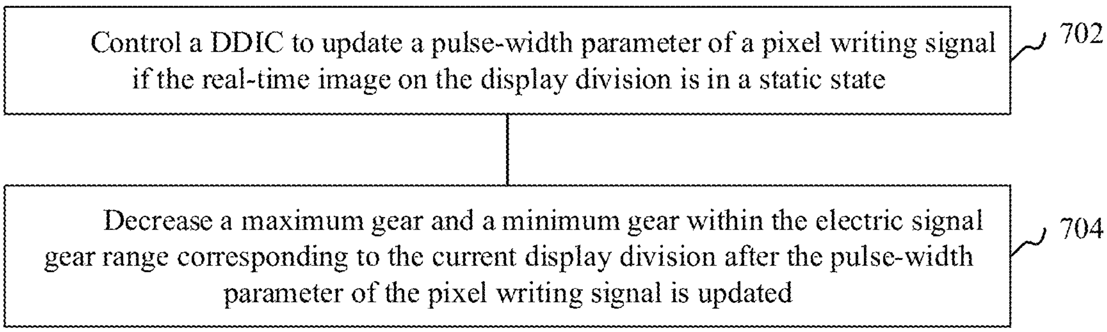
FIG. 7 is a flow chart illustrating updating of an electric signal gear range according to an embodiment of the present disclosure.

In an embodiment, reference is made to FIG. 7, which is a flow chart illustrating updating of an electric signal gear range according to an embodiment. The method further includes the following steps S702 and S704.

In step 702, if the real-time image in the display division is in the static state, the DDIC is controlled to update a pulse-width parameter of a pixel writing signal.

In step 704, a maximum gear and a minimum gear within the electric signal gear range corresponding to the current display division are decreased after the pulse-width parameter of the pixel writing signal is updated.

The pulse-width parameter of the pixel writing signal is a pulse width corresponding to a pixel writing duration. The pulse width corresponding to the pixel writing duration is a duration for which a pixel is at a low level. In one embodiment, the pulse-width parameter of the pixel writing signal is reduced when a pixel writing cycle is constant.

In practice, the display device is configured to automatically update the pulse width of the pixel writing signal instead of changing the refresh rate. In one embodiment, in response to the real-time image in the display division in the static state, the pulse width corresponding to the pixel writing duration is reduced, to update the electric signal gear range, to reduce the power consumption.

For example, if the real-time image in the display division is in the static state, the refresh rate of the display division is controlled to be constant, the AP module controls the DDIC to update the pulse-width parameter of the pixel writing signal, to decrease the maximum gear and the minimum gear within the electric signal gear range. In one embodiment, after the DDIC updates the pulse-width parameter of the pixel writing signal, the AP module decreases the maximum gear and the minimum gear within the electric signal gear range corresponding to the display division.

In the above embodiment, in response to the real-time image in the display division in the static state, the pulse-width parameter of the pixel writing signal and the electric signal gear range are updated, to significantly reduce the power consumption.

Figure 8:
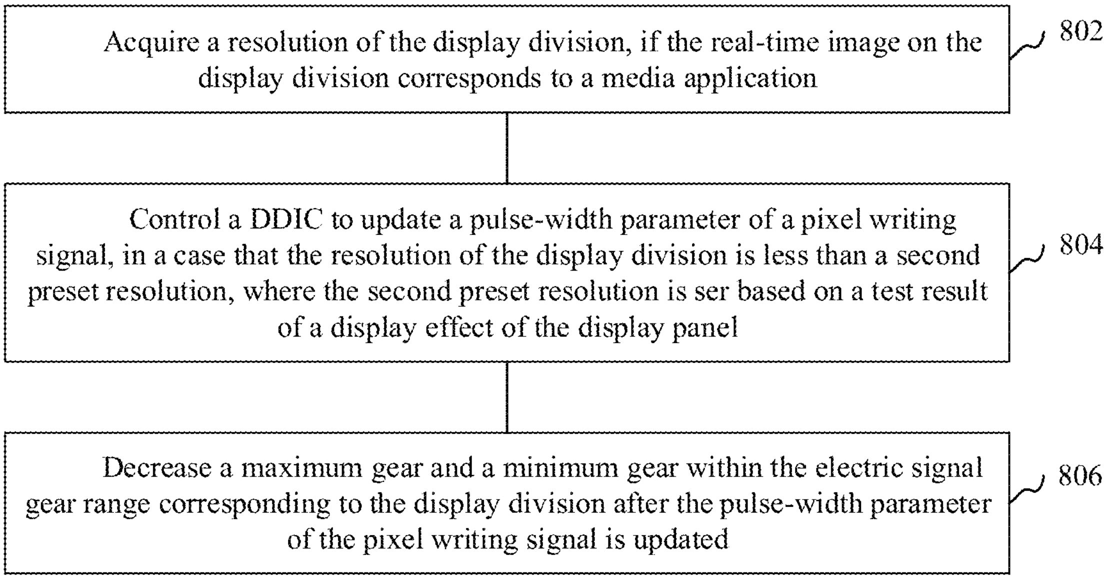
FIG. 8 is a flow chart illustrating updating of an electric signal gear range according to another embodiment of the present disclosure.

Reference is made to FIG. 8, which is a flow chart illustrating updating of an electric signal gear range according to another embodiment. The method further includes the following steps 802, 804 and 806.

In step 802, if the real-time image in the display division corresponds to the media application, the resolution of the current display division is acquired.

In step 804, in a case that the resolution of the current display division is less than a second preset resolution, the DDIC is controlled to update the pulse-width parameter of the pixel writing signal. The second preset resolution is set based on the test result of the display effect of the display panel.

In step 806, after the pulse-width parameter of the pixel writing signal is updated, the maximum gear and the minimum gear within the electric signal gear range corresponding to the display division are decreased.

The second preset resolution is less than the first preset resolution. The second preset resolution is determined based on the test result of the display effect of the display panel.

In practice, during testing the display effect of the display panel, the application type of the display image is updated to the media application. In one embodiment, the pulse-width parameter of the pixel writing signal and the resolution of the display division are updated, to obtain the test result of the display effect, to determine the second preset resolution.

In one embodiment, if the real-time image in the display division corresponds to the media application, it is determined whether to reduce the pulse width corresponding to the pixel writing duration based on the resolution of the display division.

For example, if a real-time image corresponds to the media application in the display division, the resolution of the display division is acquired, it is determined whether to update the pulse-width parameter of the pixel writing signal based on the resolution of the display division, to determine whether to decrease the minimum gear and the maximum gear within the electric signal gear range corresponding to the display division. In one embodiment, the second preset resolution is determined. In a case that the resolution of the current display division is less than the second preset resolution, the AP module sends a command to the DDIC to control the DDIC to update the pulse-width parameter of the pixel writing signal, to decrease the minimum gear and the maximum gear within the electric signal gear range corresponding to the display division in response to the determination that the pulse-width parameter of the pixel write signal is updated.

In the above embodiment, in response to the real-time image in the display division corresponding to the media application, a resolution of the current display division is acquired. In a case that the resolution of the current display division is less than the second preset resolution, the DDIC is controlled to update the pulse-width parameter of the pixel writing signal, and the minimum gear and the maximum gear within the electric signal gear range corresponding to the display division are decreased, to reduce the power consumption while improving the display effect.

Figure 9:
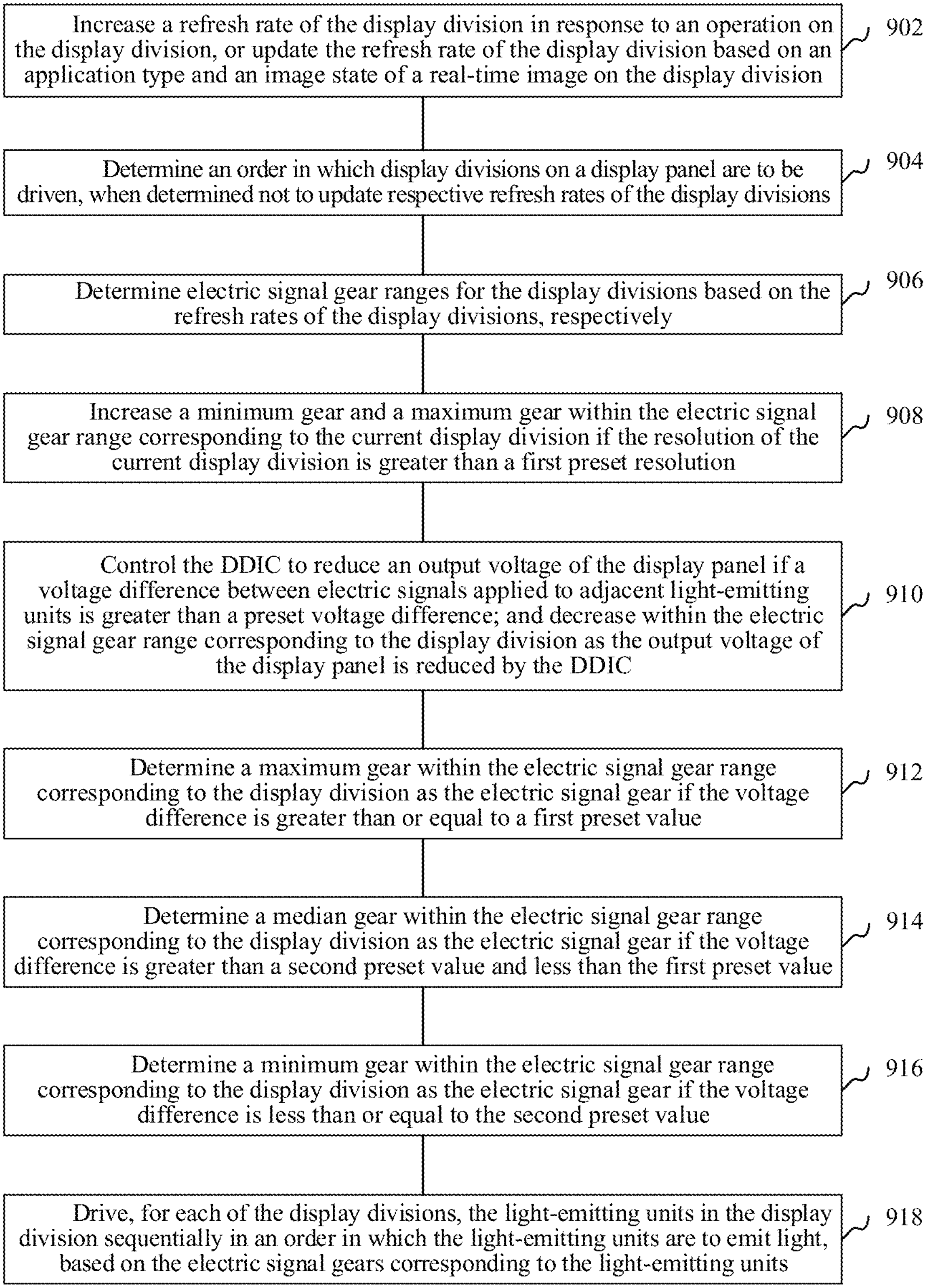
FIG. 9 is a flow chart illustrating the method for driving a display panel according to another embodiment of the present disclosure.

In order to better understand the process of driving the display panel, the process is illustrated below with an example. Reference is made to FIG. 9, which is a flow chart illustrating a method for driving a display panel according to another embodiment of the present disclosure.

In step 902, a refresh rate of the display division is increased in response to an operation in the display division. In one embodiment, the refresh rate of the display division is updated based on an application type and an image state of a real-time image in the display division.

In step 904, an order in which display divisions in the display panel are to be driven is determined when determined not to update respective refresh rates of the display divisions.

In step 906, for each of the display divisions, an electric signal gear range corresponding to the display division is determined based on the refresh rate of the display division.

In step 908, in a case that the resolution of the current display division is greater than a first preset resolution, a minimum gear and a maximum gear within the electric signal gear range corresponding to the current display division are increased.

In step 910, in a case that the display division has adjacent light-emitting units with a voltage difference greater than a preset voltage difference, the DDIC is controlled to reduce an output voltage of the display panel. A minimum gear and a maximum gear within the electric signal gear range corresponding to the display division are decreased as the output voltage of the display panel is reduced by the DDIC.

In step 912, based on the voltage difference between electric signals supplied to adjacent light-emitting units in the display division, a maximum gear within the electric signal gear range corresponding to the display division is determined as an electric signal gear corresponding to adjacent light-emitting units with a voltage difference greater than or equal to a first preset value, where the electric signal gear is configured to switch a light-emitting unit to the other light-emitting unit among the adjacent light-emitting units.

In step 914, a median gear within the electric signal gear range corresponding to the display division is determined as an electric signal gear corresponding to adjacent light-emitting units with a voltage difference greater than a second preset value and less than the first preset value, where the electric signal gear is configured to switch a light-emitting unit to the other light-emitting unit among the adjacent light-emitting units.

In step 916, a minimum gear within the electric signal gear range corresponding to the display division is determined as an electric signal gear corresponding to adjacent light-emitting units with a voltage difference less than or equal to the second preset value, where the electric signal gear is configured to switch a light-emitting unit to the other light-emitting unit among the adjacent light-emitting units.

In step 918, adjacent light-emitting units in the display division are driven sequentially based on the electric signal gear corresponding to the adjacent light-emitting units in the display division and an order for driving light-emitting units in the display division.

In the embodiment, the order in which display divisions are to be driven is determined when determined not to update respective refresh rates of the display divisions. Electric signal gear ranges for the display divisions are determined based on the refresh rates of the display divisions, respectively. The display divisions are driven sequentially in the determined order and based on the determined gear ranges. With the method, for each of the display divisions, the electric signal gear range corresponding to the display division is determined based on the refresh rate of the display division. Therefore, each of the display divisions can be accurately driven, which is beneficial to improving the overall display effect of the display panel. In addition, the electric signal gear range corresponding to each of the display divisions is precisely updated, avoiding the unnecessary power consumption, to reduce the power consumption while improving the display effect.

Figure 10:
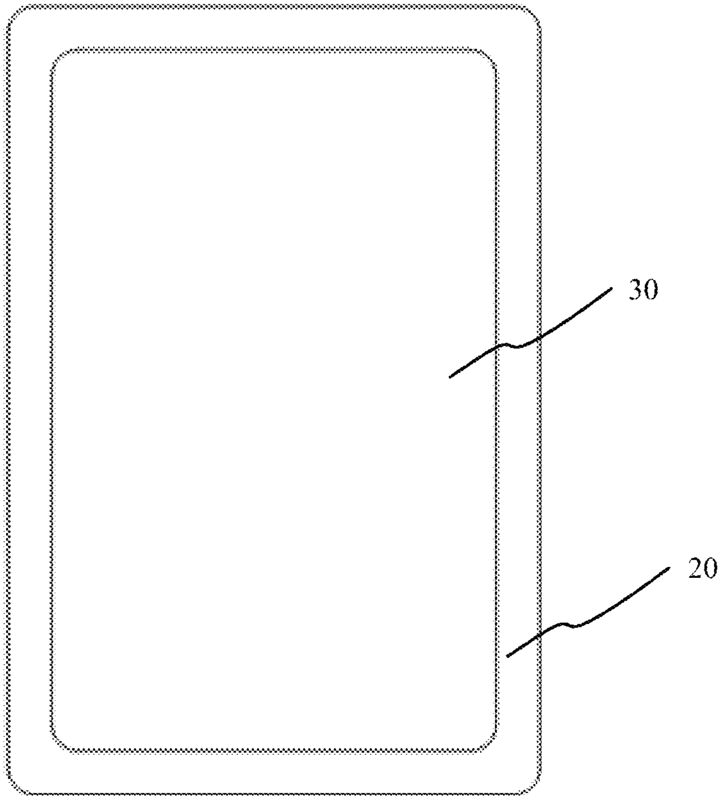
FIG. 10 is a schematic structural diagram illustrating a display device according to an embodiment of the present disclosure.

Reference is made to FIG. 10, which is a schematic structural diagram illustrating a display device according to an embodiment of the present disclosure. As shown in FIG. 10, the display device 20 includes the display panel 30 according to any one of the foregoing embodiments. For example, as shown in FIG. 10, the display device 20 includes the display panel 30. Therefore, the display device 20 also has the beneficial effects of the display panel 30 according to the foregoing embodiments. For the similarities, reference is made to the description of the display panel 10 described above, which is not repeated below.

The display device 20 according to the embodiment of the present disclosure is a mobile phone as shown in FIG. 10, or an electronic product with a display function. The display device 20 includes but not limited to a television, a laptop, a desktop display, a tablet, a digital camera, a smart bracelet, smart glasses, a vehicle-mounted display, an industrial control device, a medical display screen, a touch interaction terminal, or the like, which is not limited in the embodiment of the present disclosure.

It is to be understood that, although the steps in the flow charts of the foregoing embodiments are sequentially shown according to the indication of arrows, the steps are unnecessarily sequentially performed according to an order indicated by the arrows. Unless otherwise explicitly specified in the present disclosure, execution of the steps is not strictly limited, and the steps may be performed in other orders. In one embodiment, at least some of the steps in the flow charts in the foregoing embodiments may include multiple steps or multiple stages. These steps or stages are unnecessarily performed simultaneously but may be performed at different time instants. The steps or stages are unnecessarily performed sequentially, and may be performed in turn or alternately with other step or at least some of steps or stages in other steps instead.

Based on the same disclosure, an apparatus for driving a display panel is further provided according to an embodiment of the present disclosure, and the apparatus is configured to perform the method for driving a display panel described above. The solutions for solving the problem in the apparatus are similar to the solutions described in the method described above. Therefore, specific descriptions in one or more embodiments of the apparatus for driving a display panel below may be referred to the descriptions in the method for driving a display panel described above, which are not repeated herein.

Figure 11:
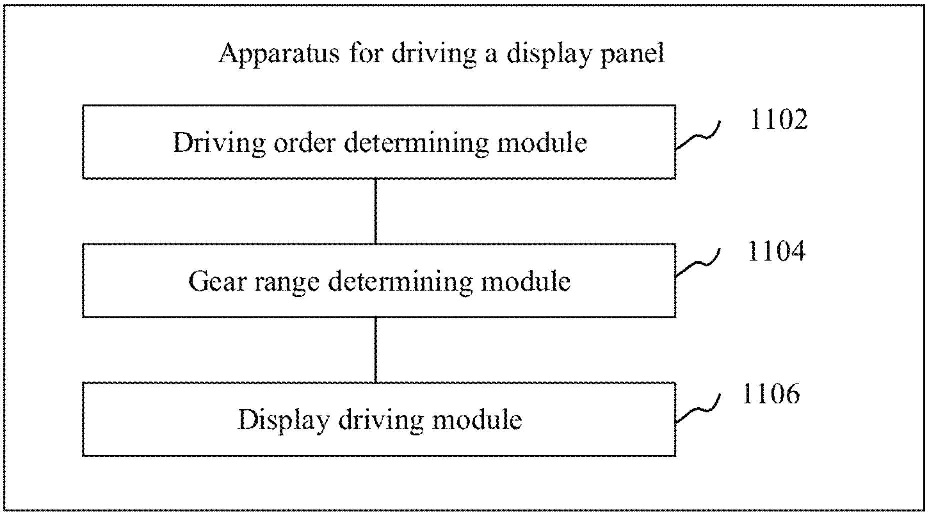
FIG. 11 is a schematic structural diagram illustrating an apparatus for driving a display panel according to an embodiment of the present disclosure.

In an embodiment, reference is made to FIG. 11, which is a structural block diagram illustrating an apparatus for driving a display panel. The apparatus includes a driving order determining module 1102, a gear range determining module 1104 and a display driving module 1106.

The driving order determining module 1102 is configured to determine an order in which display divisions on the display panel are to be driven when determined not to update respective refresh rates of the display divisions.

The gear range determining module 1104 is configured to determine electric signal gear ranges for the display divisions based on the refresh rates of the display divisions, respectively.

The display driving module 1106 is configured to drive the display divisions sequentially in the determined order and based on the determined gear ranges.

In some embodiments, the gear range determining module 1104 includes a first range determining sub-module, a second range determining sub-module, a third range determining sub-module, a fourth range determining sub-module and a fifth range determining sub-module.

The first range determining sub-module is configured to determine the electric signal gear range corresponding to the display division as a first gear range, in a case that the refresh rate of the display division is a first preset refresh rate.

The second range determining sub-module is configured to determine the electric signal gear range corresponding to the display division as a second gear range, in a case that the refresh rate of the display division is a second preset refresh rate.

The third range determining sub-module is configured to determine the electric signal gear range corresponding to the display division as a third gear range, in a case that the refresh rate of the display division is a third preset refresh rate.

The fourth range determining sub-module is configured to determine the electric signal gear range corresponding to the display division as a fourth gear range, in a case that the refresh rate of the display division is a fourth preset refresh rate.

The fifth range determining sub-module is configured to determine the electric signal gear range corresponding to the display division as a fifth gear range, in a case that the refresh rate of the display division is a fifth preset refresh rate. The first preset refresh rate, the second preset refresh rate, the third preset refresh rate, the fourth preset refresh rate and the fifth preset refresh rate are in ascending order. Extreme values in the first gear range, the second gear range, the third gear range, the fourth gear range, and the fifth gear range are in ascending order.

In some embodiments, the apparatus for driving a display panel further includes a first resolution acquiring module and a first range updating module.

The first resolution acquiring module is configured to acquire a resolution of a current display division.

The first range updating module is configured to increase a minimum gear and a maximum gear within the electric signal gear range corresponding to the current display division, in a case that the resolution of the current display division is greater than a first preset resolution. The first preset resolution is determined based on a test result of the display effect of the display panel.

In some embodiments, the display driving module includes a gear determining sub-module and a display driving sub-module.

The gear determining sub-module is configured to determine, for each of the display divisions, one or more electric signal gears corresponding to the display division from the electric signal gear range corresponding to the display division.

The display driving sub-module is configured to drive the display divisions sequentially in the driving order and based on the determined electric signal gears corresponding to the display divisions.

In some embodiments, the gear determining sub-module includes a gear determining unit.

The gear determining unit is configured to determine, for each of the display divisions, an electric signal gear from the electric signal gear range corresponding to the display division based on a voltage difference between adjacent light-emitting units in the display division. The electric signal gear is configured to switch a light-emitting unit to the other light-emitting unit among the adjacent light-emitting units, and the light-emitting unit includes pixels arranged in a single row or pixels arranged in multiple rows.

In some embodiments, the apparatus for driving a display panel is further configured to send, for each of the display divisions, a control command to a DDIC to reduce an output voltage of the display panel, in a case that the display division has adjacent light-emitting units with a voltage difference greater than a preset voltage difference; and decrease a minimum gear and a maximum gear within the electric signal gear range corresponding to the display division as the output voltage of the display panel is reduced by the DDIC.

In some embodiments, the gear determining unit is configured to determine, based on the voltage difference between adjacent light-emitting units in the display division, a maximum gear within the electric signal gear range corresponding to the display division as an electric signal gear corresponding to adjacent light-emitting units with a voltage difference greater than or equal to a first preset value, where the electric signal gear is configured to switch a light-emitting unit to the other light-emitting unit among the adjacent light-emitting units; determine a median gear within the electric signal gear range corresponding to the display division as an electric signal gear corresponding to adjacent light-emitting units with a voltage difference greater than a second preset value and less than the first preset value, where the electric signal gear is configured to switch a light-emitting unit to the other light-emitting unit among the adjacent light-emitting units, and the first preset value and the second preset value are determined based on a test result of the display effect of the display panel; and determine a minimum gear within the electric signal gear range corresponding to the display division as an electric signal gear corresponding to adjacent light-emitting units with a voltage difference less than or equal to the second preset value, where the electric signal gear is configured to switch a light-emitting unit to the other light-emitting unit among the adjacent light-emitting units.

In some embodiment, the display driving sub-module includes a display driving unit. The display driving unit is configured to drive, for each of the display divisions, adjacent light-emitting units in the display division sequentially based on the electric signal gear corresponding to the adjacent light-emitting units in the display division, in the order for driving the light-emitting units in the display division.

In some embodiment, the apparatus for driving a display panel further includes a refresh rate updating module. The refresh rate updating module is configured to update the refresh rate of the display division in real time.

In some embodiment, the refresh rate updating module includes a first updating sub-module. The first updating sub-module is configured to increase the refresh rate in response to an operation in the display division. The operation in the display division includes one of a touch operation, a pupil operation, a gesture operation, and an intelligent voice operation.

In some embodiment, the first updating sub-module is further configured to update the refresh rate of the display division based on an application type and an image state of a real-time image in the display division.

In some embodiment, the image state includes a dynamic state and a static state, and the application type at least includes a text application and a media application.

In some embodiment, the apparatus for driving a display panel is further configured to control the DDIC to update a pulse-width parameter of a pixel writing signal if the real-time image in the display division is in the static state; and decrease a maximum gear and a minimum gear within the electric signal gear range corresponding to the current display division after the pulse-width parameter of the pixel writing signal is updated.

In some embodiment, the apparatus for driving a display panel is further configured to: acquire a resolution of the current display division if the real-time image in the display division corresponds to the media application; control the DDIC to update a pulse-width parameter of a pixel writing signal, in a case that the resolution of the current display division is less than a second preset resolution, where the second preset resolution is determined based on a test result of the display effect of the display panel; and decrease a maximum gear and a minimum gear within the electric signal gear range corresponding to the display division after the pulse-width parameter of the pixel writing signal is updated.

In some embodiment, the display divisions are formed by dividing one display panel, or cascading multiple display panels.

Various modules in the apparatus for driving a display panel described above may be implemented entirely or partially by software, hardware, or a combination thereof. The foregoing modules may be embedded in or independent of a processor of a computer device in a form of hardware, or may be stored in a memory of the computer device in a form of software, and the processor invokes the foregoing modules to perform corresponding operations.

Figure 12:
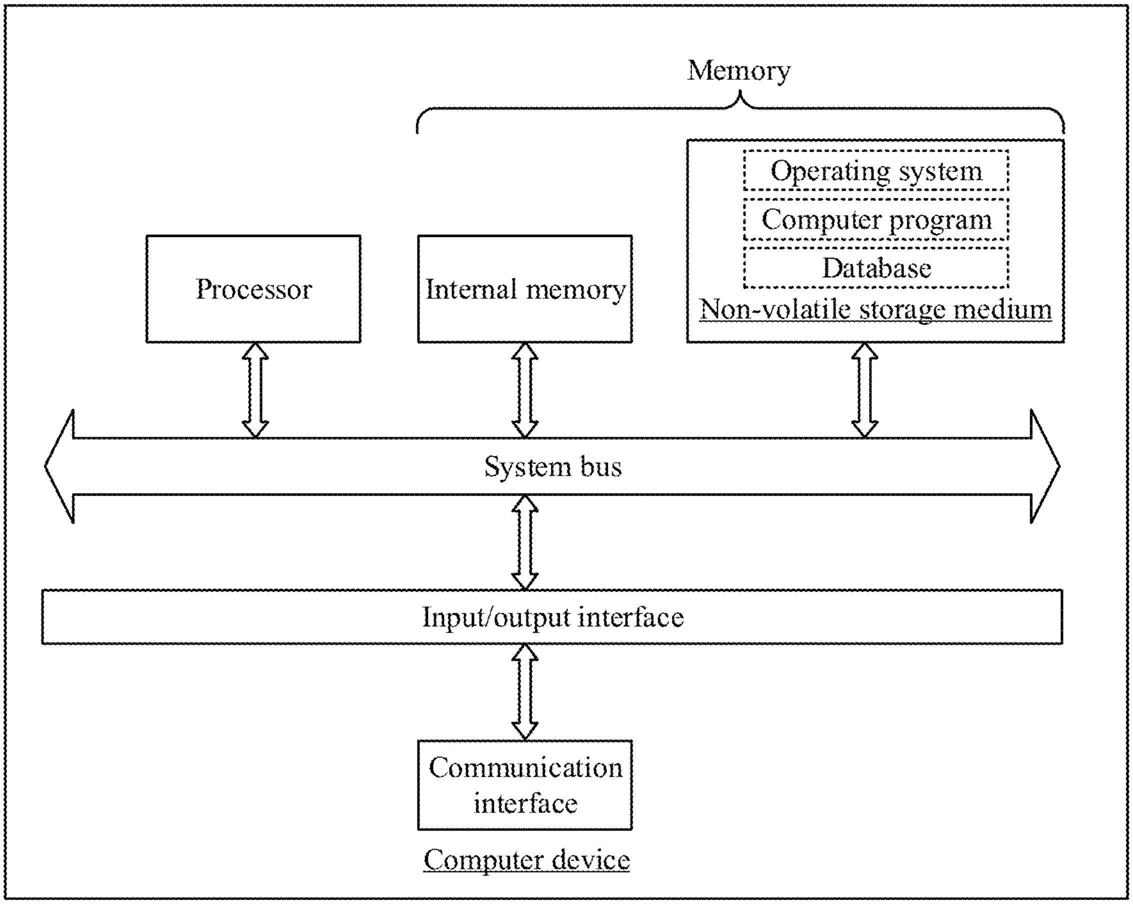
FIG. 12 is a schematic diagram illustrating an internal structure of a computer device according to an embodiment of the present disclosure.

A computer device is provided according to an embodiment. The computer device is a server, and an internal structure of the computer device is shown in FIG. 12. The computer device includes a processor, a memory, an input/output (I/O) interface, and a communication interface. The processor, the memory, and the input/output interface are connected to each other via a system bus, and the communication interface is connected to the system bus through the input/output interface. The processor of the computer device is configured to provide computing and control capabilities. The memory of the computer device includes a non-volatile storage medium and an internal memory. The non-volatile storage medium stores an operating system, a computer program, and a database. The internal memory provides an environment for running the operating system and the computer program in the non-volatile storage medium. The database of the computer device is configured to store a refresh rate and an electric signal gear range corresponding to the refresh rate. The processor exchanges information with external devices via the input/output interface of the computer device. The network interface of the computer device is configured to communicate with an external terminal through a network connection. The computer program performs, when being executed by the processor, a method for driving a display panel.

FIG. 12 is a block diagram only illustrating some structures related to the solution of the present disclosure, and is not intended to limit the computer device to which the solution of the present disclosure is applied. In one embodiment, the computer device may include more or less components than those shown in the diagram. In one embodiment, some components may be combined or components may be arranged differently.

A display driver integrated circuit (DDIC) chip is further provided according to an embodiment. The DDIC chip includes a memory and a processor. The memory stores a computer program. The processor performs, when executing the computer program, the method according to the foregoing embodiments.

It should be noted that user information (including but not limited to device information of user, personal information of user, and the like) and data (including but not limited to data for analysis, stored data, displayed data, and the like) involved in the present disclosure are authorized by the user or fully authorized by all parties. The collection, use, and processing of the relevant data complying with relevant laws, regulations, and standards of relevant countries and divisions.

All or some of procedures of the method in the foregoing embodiments may be implemented by a computer program instructing relevant hardware. The computer program may be stored in a non-volatile computer-readable storage medium. The computer program implements, when being executed, the procedures of the method in the foregoing embodiments. Any reference to a memory, a storage, a database, or another medium used in the various embodiments in the present disclosure may include at least one of a non-volatile memory and a volatile memory. The non-volatile memory includes a read-only memory (ROM), a magnetic tape, a floppy disk, a flash memory, an optical memory, a high-density embedded non-volatile memory, a resistive random access memory (ReRAM), a magnetoresistive random access memory (MRAM), a ferroelectric random access memory (FRAM), a phase change memory (PCM), a graphene memory, or the like. The volatile memory includes a random access memory (RAM), an external cache, or the like. As an illustration instead of a limitation, the RAM is in multiple forms, such as a static random access memory (SRAM) or a dynamic random access memory (DRAM). The database involved in the various embodiments of the present disclosure includes at least one of a relational database and a non-relational database. The non-relational database includes a blockchain-based distributed database, or the like, and the present disclosure is not limited to this. The processor involved in the various embodiments of the present disclosure includes a general-purpose processor, a central processor, a graphics processor, a digital signal processor, a programmable logic unit, a data processing logic unit based on quantum computing, or the like, and the present disclosure is not limited to this.

The features of the foregoing embodiments can be combined arbitrarily. All possible combinations of the features of the foregoing embodiments are not enumerated for concise description. Any combination of the features that do not conflict are considered as falling within the embodiments of the present disclosure.

The foregoing embodiments only describe some implementations of the present disclosure, and are described in detail, but are to be not construed as a limitation to the scope of the present disclosure. It should be noted that, some modifications and improvements can be made in the present disclosure. These modifications and improvements fall within the protection scope of the present disclosure. Therefore, the protection scope of the present disclosure is subject to the claims.

The invention claimed is:

1. A method for driving a display panel, comprising: determining an order in which display divisions on the display panel are to be driven, when determined not to update respective refresh rates of the display divisions;

determining electric signal gear ranges for the display divisions based on the refresh rates of the display divisions, respectively;

driving the display divisions sequentially in the determined order and based on the determined gear ranges;

determining the electric signal gear range for the display division of a first preset refresh rate as a first gear range;

determining the electric signal gear range for the display division of a second preset refresh rate as a second gear range;

determining the electric signal gear range for the display division of a third preset refresh rate as a third gear range;

determining the electric signal gear range for the display division of a fourth preset refresh rate as a fourth gear range; and determining the electric signal gear range for the display division of a fifth preset refresh rate as a fifth gear range; wherein the first preset refresh rate, the second preset refresh rate, the third preset refresh rate, the fourth preset refresh rate and the fifth preset refresh rate are in ascending order, and an extreme value in the first gear range, an extreme value in the second gear range, an extreme value in the third gear range, an extreme value in the fourth gear range, and an extreme value in the fifth gear range are in ascending order.

2. The method according to claim 1, further comprising: acquiring a resolution of the current display division; and increasing a minimum gear and a maximum gear within the electric signal gear range corresponding to the current display division, if the resolution of the current display division is greater than a first preset resolution, wherein the first preset resolution is set based on a test result of a display effect of the display panel.

3. The method according to claim 1, wherein the driving the display divisions sequentially in the determined order and based on the determined gear ranges comprises: determining at least one electric signal gear for each of the display divisions from the corresponding electric signal gear range; and driving the display divisions sequentially in the determined order and the respective electric signal gears of the display divisions.

4. The method according to claim 3, wherein the determining at least one electric signal gear for each of the display divisions from the corresponding electric signal gear range comprises:

determining an electric signal gear for switching from one light-emitting unit to an adjacent light-emitting unit in the same display division, from the electric signal gear range corresponding to the display division and based on a voltage difference between electric signals applied to two light-emitting units, wherein the light-emitting unit comprises pixels arranged in a single row or pixels arranged in a plurality of rows.

5. The method according to claim 4, further comprising:

sending a control command to a display driver integrated circuit (DDIC) to reduce an output voltage of the display panel, if the voltage difference is greater than a preset voltage difference; and decreasing a minimum gear and a maximum gear within the electric signal gear range corresponding to the display division as the output voltage of the display panel is reduced by the DDIC.

6. The method according to claim 4, wherein the determining an electric signal gear for switching from one light-emitting unit to an adjacent light-emitting unit in the same the display division, from the electric signal gear range corresponding to the display division and based on a voltage difference between electric signals applied to the two light-emitting units comprises:

determining a maximum gear within the electric signal gear range corresponding to the display division as the electric signal gear if the voltage difference is greater than or equal to a first preset value;

determining a median gear within the electric signal gear range corresponding to the display division as the electric signal gear if the voltage difference is greater than a second preset value and less than the first preset value, wherein the first preset value and the second preset value are set based on a test result of a display effect of the display panel; and determining a minimum gear within the electric signal gear range corresponding to the display division as the electric signal gear if the voltage difference is less than or equal to the second preset value.

7. The method according to claim 6, wherein the driving the display divisions sequentially in the determined order and the respective electric signal gears of the display divisions comprises:

driving, for each of the display divisions, the light-emitting units in the display division sequentially in an order for driving the light-emitting units, based on the electric signal gears corresponding to the light-emitting units.

8. The method according to claim 1, further comprising:

updating the respective refresh rates of the display divisions in real time.

9. The method according to claim 8, wherein the updating the respective refresh rates of the display divisions in real time comprises:

increasing the refresh rate in response to an operation on the corresponding display division, wherein the operation in the display division comprises one of a touch operation, a pupil operation, a gesture operation, and an intelligent voice operation.

10. The method according to claim 8, wherein the updating the respective refresh rates of the display divisions in real time comprises:

updating the refresh rate of the corresponding display division based on an application type and an image state of a real-time image in the display division.

11. The method according to claim 10, wherein the image state comprises a dynamic state and a static state, and the application type comprises at least a text application and a media application.

12. The method according to claim 11, further comprising:

controlling a display driver integrated circuit (DDIC) to update a pulse-width parameter of a pixel writing signal, if the real-time image in the display division is in the static state; and decreasing a maximum gear and a minimum gear within the electric signal gear range corresponding to the display division after the pulse-width parameter of the pixel writing signal is updated.

13. The method according to claim 11, further comprising:

acquiring a resolution of the display division, if the real-time image in the display division corresponds to the media application;

controlling a display driver integrated circuit (DDIC) to update a pulse-width parameter of a pixel writing signal, in a case that the resolution of the display division is less than a second preset resolution, wherein the second preset resolution is set based on a test result of a display effect of the display panel; and decreasing a maximum gear and a minimum gear within the electric signal gear range corresponding to the display division after the pulse-width parameter of the pixel writing signal is updated.

14. The method according to claim 1, wherein the display divisions are formed by dividing one display panel, or cascading a plurality of display panels.

15. An apparatus for driving a display panel, comprising:

a driving order determining module, configured to determine an order in which display divisions on the display panel are to be driven when determined not to update respective refresh rates of the display divisions; a gear range determining module, configured to determine electric signal gear ranges for the display divisions based on the refresh rates of the display divisions, respectively; and a display driving module, configured to drive the display divisions sequentially in the determined order and based on the determined gear ranges, wherein the gear range determining module is further configured to:

determine the electric signal gear range for the display division of a first preset refresh rate as a first gear range;

determine the electric signal gear range for the display division of a second preset refresh rate as a second gear range;

determine the electric signal gear range for the display division of a third preset refresh rate as a third gear range;

determine the electric signal gear range for the display division of a fourth preset refresh rate as a fourth gear range; and determine the electric signal gear range for the display division of a fifth preset refresh rate as a fifth gear range; wherein the first preset refresh rate, the second preset refresh rate, the third preset refresh rate, the fourth preset refresh rate and the fifth preset refresh rate are in ascending order, and an extreme value in the first gear range, an extreme value in the second gear range, an extreme value in the third gear range, an extreme value in the fourth gear range, and an extreme value in the fifth gear range are in ascending order.

16. A display driver integrated circuit (DDIC) chip, comprising:

a memory, configured to store a computer program; and a processor, configured to execute the computer program to:

determine an order in which display divisions on a display panel are to be driven, when determined not to update respective refresh rates of the display divisions;

determine electric signal gear ranges for the display divisions based on the refresh rates of the display divisions, respectively; and drive the display divisions sequentially in the determined order and based on the determined gear ranges, wherein the processor is further configured to:

determine the electric signal gear range for the display division of a first preset refresh rate as a first gear range;

determine the electric signal gear range for the display division of a second preset refresh rate as a second gear range;

determine the electric signal gear range for the display division of a third preset refresh rate as a third gear range;

determine the electric signal gear range for the display division of a fourth preset refresh rate as a fourth gear range; and determine the electric signal gear range for the display division of a fifth preset refresh rate as a fifth gear range; wherein the first preset refresh rate, the second preset refresh rate, the third preset refresh rate, the fourth preset refresh rate and the fifth preset refresh rate are in ascending order, and an extreme value in the first gear range, an extreme value in the second gear range, an extreme value in the third gear range, an extreme value in the fourth gear range, and an extreme value in the fifth gear range are in ascending order.

* * * * *